United States Patent
Park et al.

(10) Patent No.: US 11,816,577 B2
(45) Date of Patent: *Nov. 14, 2023

(54) AUGMENTATION OF AUDIOGRAPHIC IMAGES FOR IMPROVED MACHINE LEARNING

(71) Applicant: Google LLC, Mountain View, CA (US)

(72) Inventors: Daniel Sung-Joon Park, Sunnyvale, CA (US); Quoc Le, Sunnyvale, CA (US); William Chan, Toronto (CA); Ekin Dogus Cubuk, San Francisco, CA (US); Barret Zoph, San Francisco, CA (US); Yu Zhang, Mountain View, CA (US); Chung-Cheng Chiu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,548

(22) Filed: Sep. 28, 2021

(65) Prior Publication Data

US 2022/0012537 A1 Jan. 13, 2022

Related U.S. Application Data

(63) Continuation of application No. 16/416,888, filed on May 20, 2019, now Pat. No. 11,138,471.

(Continued)

(51) Int. Cl.
*G10L 15/06* (2013.01)
*G10L 15/12* (2006.01)
(Continued)

(52) U.S. Cl.
CPC ......... *G06N 3/084* (2013.01); *G06F 18/2148* (2023.01); *G06N 20/00* (2019.01);
(Continued)

(58) Field of Classification Search
CPC .............................. G10L 15/063; G10L 15/12
See application file for complete search history.

(56) References Cited

U.S. PATENT DOCUMENTS

| 9,704,478 B1 | 7/2017 | Vitaladevuni et al. |
| 10,264,383 B1 * | 4/2019 | Johnson ................... H04R 3/12 |

(Continued)

OTHER PUBLICATIONS

Audhkhasi et al., "Building Competitive Direct Acoustics-to-Word Models for English Conversational Speech Recognition", arXiv:1712.03133v1, Dec. 8, 2017, 5 pages.

(Continued)

*Primary Examiner* — Bryan S Blankenagel
(74) *Attorney, Agent, or Firm* — Dority & Manning, P.A.

(57) ABSTRACT

Generally, the present disclosure is directed to systems and methods that generate augmented training data for machine-learned models via application of one or more augmentation techniques to audiographic images that visually represent audio signals. In particular, the present disclosure provides a number of novel augmentation operations which can be performed directly upon the audiographic image (e.g., as opposed to the raw audio data) to generate augmented training data that results in improved model performance. As an example, the audiographic images can be or include one or more spectrograms or filter bank sequences.

22 Claims, 7 Drawing Sheets
(2 of 7 Drawing Sheet(s) Filed in Color)

Related U.S. Application Data

(60) Provisional application No. 62/831,528, filed on Apr. 9, 2019, provisional application No. 62/673,777, filed on May 18, 2018.

(51) Int. Cl.
    *G06N 3/084*     (2023.01)
    *G10L 15/16*     (2006.01)
    *G10L 15/28*     (2013.01)
    *G06N 20/00*     (2019.01)
    *G06F 18/214*     (2023.01)
    *G06V 10/774*     (2022.01)
    *G06V 10/82*     (2022.01)

(52) U.S. Cl.
    CPC .......... *G06V 10/7747* (2022.01); *G06V 10/82* (2022.01); *G10L 15/063* (2013.01); *G10L 15/12* (2013.01); *G10L 15/16* (2013.01); *G10L 15/28* (2013.01)

(56) References Cited

U.S. PATENT DOCUMENTS

| | | | |
|---|---|---|---|
| 10,755,728 B1* | 8/2020 | Ayrapetian | G10L 21/0272 |
| 2006/0025947 A1 | 2/2006 | Earls | |
| 2013/0339011 A1* | 12/2013 | Visser | G10H 1/361 704/207 |
| 2014/0058478 A1* | 2/2014 | Fruhauf | A61N 1/0541 607/57 |
| 2015/0199959 A1 | 7/2015 | Skoglund et al. | |
| 2018/0152799 A1 | 5/2018 | Fraundorf et al. | |
| 2019/0130896 A1* | 5/2019 | Zhou | G06N 3/084 |
| 2019/0130897 A1 | 5/2019 | Zhou et al. | |
| 2019/0318755 A1 | 10/2019 | Tashev et al. | |
| 2020/0273483 A1 | 8/2020 | Li et al. | |
| 2021/0020190 A1 | 1/2021 | Hiroe | |

OTHER PUBLICATIONS

Auchkhasi et al., "Direct Acoustics-to-Word Models for English Conversational Speech Recognition", arXiv:1703.07754v1, Mar. 22, 2017, 5 pages.
Bahdanau et al., "End-to-End Attention-Based Large Vocabulary Speech Recognition", arXiv:1508.04395v2, Mar. 14, 2016, 8 pages.
Chan et al., "Listen, Attend and Spell: A Neural Network for Large Vocabulary Conversational Speech Recognition", International Conference on Acoustics, Speech and Signal Processing, Mar. 20-25, 2016, Shanghai, China, pp. 4960-4964.
Chiu et al., "State-of-the-Art Speech Recognition with Sequence-to-Sequence Models", arXiv: 1712.01769v6, Feb. 23, 2018, 5 pages.
Chorowski et al., "Towards Better Decoding and Language Model Integration in Sequence to Sequence Models", Conference of the International Speech Association, Aug. 20-24, 2017, Stockholm, Sweden, pp. 523-527.
Cieri et al., "The Fisher Corpus: A Resource for the Next Generations of Speech-To-Text", Conference on Language Resources and Evaluation, May 26-28, 2004, Lisbon, Portugal, pp. 69-71.
Collobert et al., "Wav2Letter: an End-to-End ConvNet-based Speech Recognition System", arXiv:1609.03193v2, Sep. 13, 2016, 8 pages.
Cubuk et al., "Autoaugment: Learning Augmentation Policies from Data", arXiv:1805.09501v2, Oct. 9, 2018, 14 pages.
Dahl et al., "Context-Dependent Pre-Trained Deep Neural Networks for Large-Vocabulary Speech Recognition", Transactions on Audio, Speech, and Language Processing, vol. 20, No. 1, Jan. 2012, pp. 30-42.
DeVries et al., "Improved Regularization of Convolutional Neural Networks with Cutout", arXiv:1708.04552v2, Nov. 29, 2017, 8 pages.
Godfrey et al., "Switchboard: Telephone Speech Corpus for Research And Development", Conference of the International Speech Communication Association, Mar. 23-26, 1992, San Francisco, California, pp. 517-520.
Graves et al., "Speech Recognition with Deep Recurrent Neural Networks", International Conference on Acoustics, Speech and Signal Processing, May 26-31, 2013, Vancouver, Canada, 5 pages.
Graves et al., "Towards End-to-End Speech Recognition with Recurrent Neural Networks", Conference on Machine Learning, Jun. 21-26, 2014, Beijing, China, 9 pages.
Graves, "Practical Variational Inference for Neural Networks", Conference on Neural Information Processing System, Dec. 12-17, 2011, Granada, Spain, 9 pages.
Gulcehre et al., "On Using Monolingual Corpora in Neural Machine Translation", Jun. 12, 2015, arXiv:1503.03535v2, Jun. 12, 2015, 9 pages.
Hadian et al., "End-to-End Speech Recognition Using Lattice-Free MMI", Conference of the International Speech Communication Association, Sep. 2-6, 2018, Hyderabad, India, 5 pages.
Han et al., "The CAPIO 2017 Conversational Speech Recognition System", arXiv:1801.00059v2, Apr. 10, 2018, 8 pages.
Hannun et al., "Deep Speech: Scaling Up End-to-End Speech Recognition", Dec. 19, 2014, 12 pages.
Hinton et al., "Deep Neural Networks for Acoustic Modeling in Speech Recognition", Signal Processing Magazine, vol. 29, Nov. 2012, 16 pages.
Irie et al., "Model Unit Exploration for Sequence-to-Sequence Speech Recognition", arXiv:1902.01955v1, Feb. 5, 2019, 5 pages.
Jaitly et al., "Vocal Tract Length Perturbation (VTLP) Improves Speech Recognition", International Conference on Machine Learning, Jun. 16-21, 2013, Atlanta, Georgia, 5 pages.
Kanda et al., "Elastic Spectral Distortion for Low Resource Speech Recognition with Deep Neural Networks", Automatic Speech Recognition and Understanding Workshop, Dec. 8-12, 2013, Olomouc, Czech Republic, pp. 309-314.
Kim et al., "Generation of Large-Scale Simulated Utterances in Virtual Rooms to Train Deep-Neural Networks for Far-Field Speech Recognition in Google Home", Conference of the International Speech Communication Association, Aug. 20-27, 2017, Stockholm, Sweden, pp. 379-383.
Ko et al., "Audio Augmentation for Speech Recognition", Conference of the International Speech Communication Association. Sep. 6-10, 2015, Dresden, Germany, 4 pages.
Kovács et al., "Examining the Combination of Multi-Band Processing and Channel Dropout for Robust Speech Recognition", Proceedings of Interspeech 2019, 2019, pp. 421-425.
Kovács et al., "Increasing the Robustness of CNN Acoustic Models Using ARMA Spectrogram Features and Channel Dropout", Pattern Recognition Letters, 9 pages.
Liptchinsky et al., "Letter-Based Speech Recognition with Gated ConvNets", arXiv:1712.09444v1, Dec. 22, 2017, 13 pages.
Lu et al., "On Training the Recurrent Neural Network Encoder-Decoder for Large Vocabulary End-to-End Speech Recognition", International Conference on Acoustics, Speech and Signal Processing, Mar. 20-25, 2016, Shanghai, China, 5 pages.
Mallidi et al., "A Framework for Practical Multistream ASR", Proceedings of Interspeech 2016, 5 pages.
Mallidi et al., "Novel Neural Network Based Fusion for Mutlistream ASR", International Conference on Acoustics, Speech and Signal Processing 2016, Shanghai, China, Mar. 20-25, 2016, 5 pages.
Mallidi et al., Poster for "Novel Neural Network Based Fusion for Mutlistream ASR", International Conference on Acoustics, Speech and Signal Processing 2016, Shanghai, China, Mar. 20-25, 2016, 1 page.
Mallidi, Sri Harish, "A Practical and Efficient Multistream Framework for Noise Robust Speech Recognition", Johns Hopkins University, Doctoral Thesis, 2018, Chapter II, 16 pages.
Panayotov et al., "Librispeech: An ASR Corpus Based on Public Domain Audio Books", International Conference on Acoustics, Speech and Signal Processing, Apr. 19-24, 2015, Brisbane, Australia, 5 pages.

(56) References Cited

OTHER PUBLICATIONS

Povey et al., "Purely Sequence-Trained Neural Networks for ASR Based on Lattice-Free MMI", Conference of the International Speech Association, Sep. 8-12, 2016, San Francisco, California, 5 pages.
Povey et al., "The Kaldi Speech Recognition Toolkit", Automatic Speech Recognition and Understanding Workshop, Dec. 11-15, 2011, Big Island, Hawaii, 4 pages.
Prabhavalkar et al., "Automatic gain control and multi-style training for robust small-footprint keyword spotting with deep neural networks", International Conference on Acoustic, Speech and Signal Processing, Apr. 19-24, 2015, Brisbane, Australia, 5 pages.
Ragni et al., "Data Augmentation for Low Resource Languages", Conference of the International Speech Communication Association, Sep. 14-18, 2014, Singapore, pp. 810-814.
Raju et al., "Data Augmentation for Robust Keyword Spotting under Playback Interference", arXiv:1808.00563v1, Aug. 1, 2018, 6 pages.
Sabour et al., "Optimal Completion Distillation for Sequence Learning", International Conference on Learning Representations, May 6-9, 2019, New Orleans, Louisiana, 16 pages.
Sainath et al., "Deep Convolutional Neural Networks for LVCSR", International Conference on Acoustics, Speech and Signal Processing, May 26-31, 2013, Vancouver, Canada, 5 pages.
Schuster et al., "Japanese And Korean Voice Search", International Conference on Acoustics, Speech and Signal Processing, Mar. 25-30, 2012, Kyoto, Japan, 4 pages.
Szegedy et al., "Rethinking the Inception Architecture for Computer Vision", Conference on Computer Vision and Pattern Recognition, Jun. 26-Jul. 1, 2016, Las Vegas, Nevada, pp. 2818-2826.
Toshniwal et al., "Multitask Learning with Low-Level Auxiliary Tasks for Encoder-Decoder Based Speech Recognition", arXiv:1704.01631v2, Apr. 19, 2017, 5 pages.
Tóth et al., "A Perceptually Inspired Data Augmentation Method for Noise Robuts CNN Acoustic Models", Lecture Notes in Computer Science 9including subseries Lecture Notes in Artificial Intelligence and Lecture Notes in Bioinformatics) 2018, vol. 11096, pp. 697-706.
Vesely et al., "Sequence Discriminative Training of Deep Neural Networks", Conference of the International Speech Communication Association, Aug. 25-29, 2013, Lyon, France, 5 pages.
Weng et al., "Improving Attention Based Sequence-to-Sequence Models for End-to-End English Conversational Speech Recognition", Conference of the International Speech Communication Association, Sep. 2-6, 2018, Hyderabad, India, 5 pages.
Yang et al., "A Novel Pyramidal-FSMN Architecture with Lattice-Free MMI for Speech Recognition", arXiv:1810.11352v2, Oct. 31, 2018, 5 pages.
Zeghidour et al., "Fully Convolutional Speech Recognition", arXiv:1812.06864v1, Dec. 17, 2018, 5 pages.
Zeyer et al., "A Comprehensive Analysis on Attention Models", Conference on Neural Information Processing Systems, Dec. 3-8, 2018, Montreal, Canada, 12 pages.
Zeyer et al., "Improved Training of End-to-End Attention Models for Speech Recognition", arXiv:1805.03294v1, May 8, 2018, 6 pages.
Zhou et al., "Improving End-to-End Speech Recognition with Policy Learning", arXiv:1712.07101v1, Dec. 19, 2017, 5 pages.
Zweig et al., "Advances in All-Neural Speech Recognition", , International Conference on Acoustics, Speech and Signal Processing, May 5-9, 2017, New Orleans, Louisiana, 5 pages.

* cited by examiner

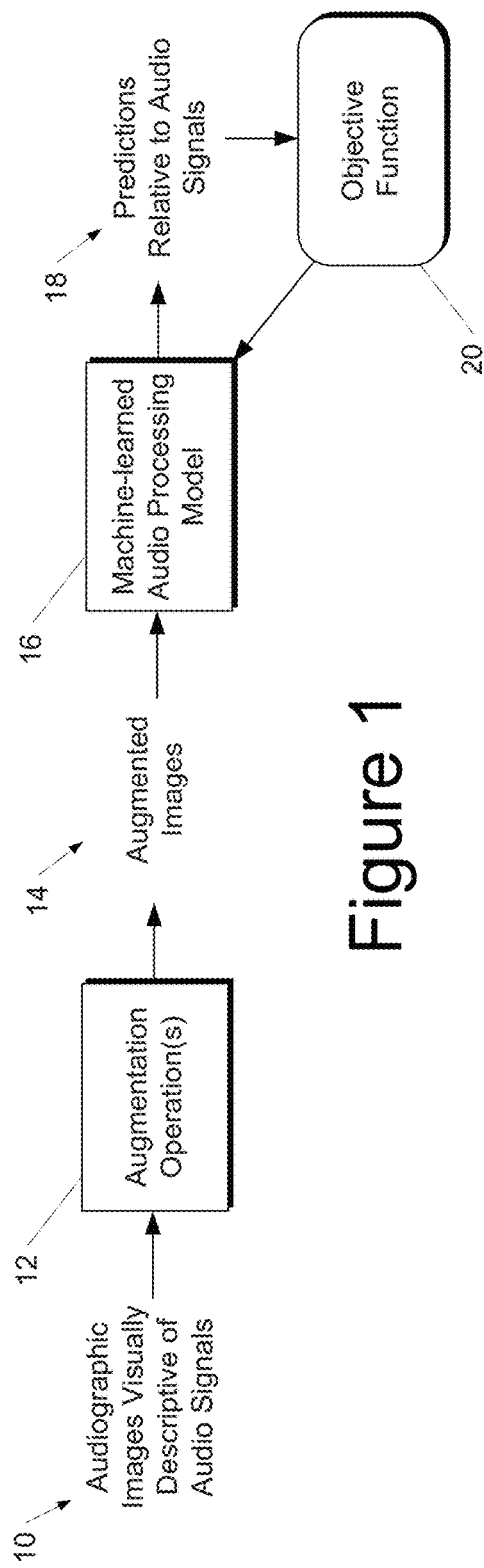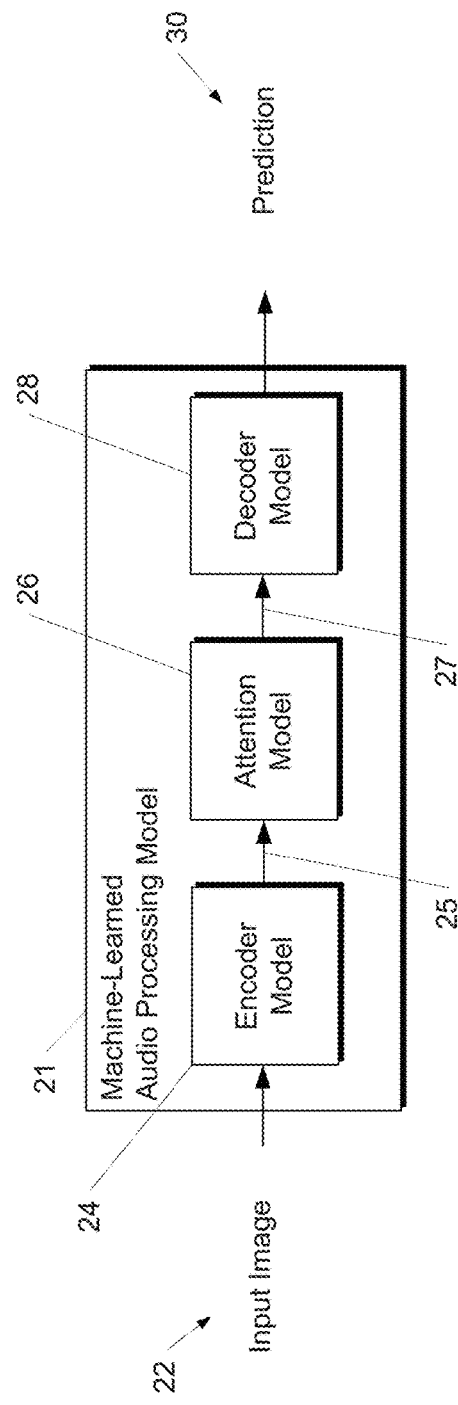
Figure 1
Figure 2

AUGMENTATION OF AUDIOGRAPHIC IMAGES FOR IMPROVED MACHINE LEARNING

RELATED APPLICATIONS

This application is a continuation of U.S. application Ser. No. 16/416,888, filed on May 20, 2019 which claims priority to and the benefit of both U.S. Provisional Patent Application No. 62/673,777, filed May 18, 2018 and U.S. Provisional Patent Application No. 62/831,528, filed Apr. 9, 2019. Each of U.S. Provisional Patent Application No. 62/673,777, filed May 18, 2018 and U.S. Provisional Patent Application No. 62/831,528, filed Apr. 9, 2019 is hereby incorporated by reference in its entirety.

FIELD

The present disclosure relates generally to machine learning. More particularly, the present disclosure relates to systems and methods that generate augmented training data for machine-learned models via application of one or more augmentation techniques to audiographic images that visually represent audio signals.

BACKGROUND

Machine learning approaches such as deep learning have been successfully applied to automatic speech recognition (ASR) and other problems associated with comprehending or otherwise processing audio signals such as audio signals that include human speech. The main focus of research in this regard has been designing better network architectures such as, for example, improved neural networks and end-to-end models. However, these models tend to overfit easily and require large amounts of training data.

Data augmentation has been generally proposed as a method to generate additional training data for various machine learning-based systems. Existing data augmentation techniques in the audio processing space perform data augmentation directly upon the underlying the raw audio data that encodes the audio signal. For example, one existing augmentation technique includes adding noise to the audio signal. However, augmentation techniques that operate on the raw audio data have a number of drawbacks, including, as one example, being computationally slow and challenging to implement. As another example drawback, certain techniques, such as the addition of noise described above, require a source of additional data (e.g., a source of the noise) which can complicate the augmentation process. For these and other reasons, existing raw audio augmentation techniques are typically performed in an offline fashion in advance of the model training activities.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to generate augmented training data. The method includes obtaining, by one or more computing devices, one or more audiographic images that respectively visually represent one or more audio signals. The method includes performing, by the one or more computing devices, one or more augmentation operations on each of the one or more audiographic images to generate one or more augmented images. The method includes inputting, by the one or more computing devices, the one or more augmented images into a machine-learned audio processing model. The method includes receiving, by the one or more computing devices, one or more predictions respectively generated by the machine-learned audio processing model based on the one or more augmented images. The method includes evaluating, by the one or more computing devices, an objective function that scores the one or more predictions respectively generated by the machine-learned audio processing model. The method includes modifying, by the one or more computing devices, respective values of one or more parameters of the machine-learned audio processing model based on the objective function.

Another example aspect of the present disclosure is directed to a computing system. The computing system includes one or more processors; a controller model; and one or more non-transitory computer-readable media that collectively store instructions that, when executed by the one or more processors, cause the computing system to perform operations. The operations include accessing a training dataset that comprises a plurality of training images, wherein each training image comprises an audiographic image that visually represents an audio signal. The operations include, for each of a plurality of iterations: selecting, by the controller model, a series of one or more augmentation operations; performing the series of one or more augmentation operations on each of one or more training images to generate one or more augmented images; and training a machine-learned audio processing model based at least in part on the one or more augmented images. The operations include, after training the machine-learned audio processing model, evaluating one or more performance characteristics of the machine-learned audio processing model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed discussion of embodiments directed to one of ordinary skill in the art is set forth in the specification, which makes reference to the appended figures, in which:

FIG. 1 depicts a block diagram of an example machine-learned audio processing model according to example embodiments of the present disclosure.

FIG. 2 depicts a block diagram of an example machine-learned audio processing model that includes encoder, attention, and decoder models according to example embodiments of the present disclosure.

Figure 3A:
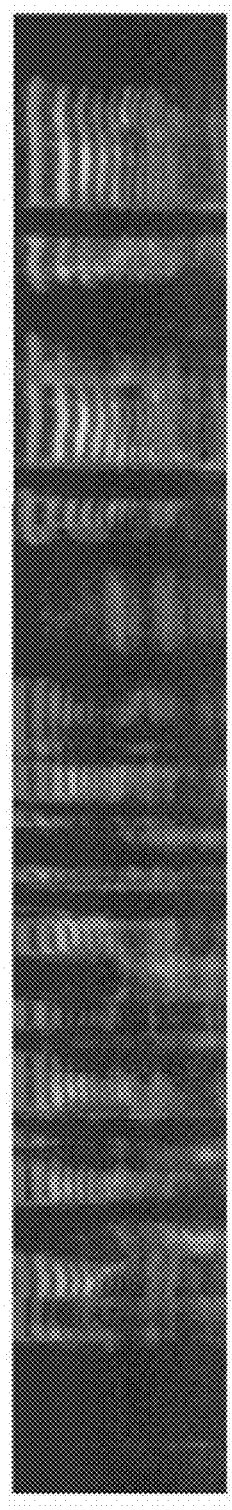
FIG. 3A depicts an example audiographic image that visually represents an audio signal according to example embodiments of the present disclosure.

Reference numerals that are repeated across plural figures are intended to identify the same features in various implementations.

DETAILED DESCRIPTION

Overview

Generally, the present disclosure is directed to systems and methods that generate augmented training data for machine-learned models via application of one or more augmentation techniques to audiographic images that visually represent audio signals. In particular, the present disclosure provides a number of novel augmentation operations which can be performed directly upon the audiographic image (e.g., as opposed to the raw audio data) to generate augmented training data that results in improved model performance. As an example, the audiographic images can be or include one or more spectrograms or filter bank sequences. The systems and methods of the present disclosure can be applied to any machine learning system that makes predictions relative to an audio signal based on an input that includes, at least in part, an audiographic image that visually represents the audio signal. As one example, the augmentation techniques described herein can be applied to neural networks (e.g., end-to-end networks) configured to perform automatic speech recognition on audio signals based on their corresponding audiographic images.

By operating on the audiographic images (e.g., rather than on the raw audio), the augmentation operations described herein are significantly easier and computationally less expensive to apply, as processing of image data is less complex than processing of raw audio waveform data. Furthermore, additional sources of data (e.g., sources of noise) are not required. For these and other reasons, the augmentation operations described herein can optionally be performed in an online fashion at the time of model training, thereby reducing the amount of pre-processing needed to perform model training. In addition, the augmentation techniques provided herein have been experimentally shown to enable learning of state-of-the-art machine-learned models which outperform, among others, models trained using on augmented training data generated through augmentation of the raw audio waveform.

With reference now to the Figures, example embodiments of the present disclosure will be discussed in further detail.

Example Augmentation Process and Machine-Learned Models

FIG. 1 depicts a block diagram of an example machine-learned audio processing model 16 according to example embodiments of the present disclosure. In particular, FIG. 1 shows an example scheme in which the machine-learned audio processing model 16 is trained using augmented training data.

More specifically, a computing system can obtain one or more audiographic images 10 that are visually descriptive of audio signals. The audio signals can be training audio signals included in a training dataset for training the audio processing model 16 to process the audio signals (or other forms of data descriptive thereof). The audio signals can be any type of audio signals including audio signals that include human speech utterances, musical instruments, and/or any other sounds.

As examples, the audiographic images 10 can be or include one or more filter bank sequences, spectrograms (e.g., linear spectrograms, log meld spectrograms, etc.), sonographs, voice graphs, voice prints, voice grams, and/or any other visual representations of audio. In some implementations, the audiographic images 10 can include multiple images "stacked" together, concatenated, or otherwise combined, where the multiple images which to different portions of the audio signal (e.g., different times). In some implementations, the audiographic images 10 can include a first axis (e.g., a vertical axis) that corresponds to frequency and a second axis (e.g., a horizontal axis) that corresponds to time. In some implementations, the values of pixels of the audiographic images 10 (e.g., color or brightness values) can correspond to or represent an intensity or volume of the audio signal at a corresponding time and frequency.

In some implementations, the training dataset can include the audio signals (e.g., raw audio signal data) and the computing system can obtain the audiographic images 10 by performing one or more transforms or other processing techniques to generate corresponding the audiographic images 10. For example, the computing system can apply one or more frequency-based filters to the one or more audio signals to generate the one or more audiographic images 10. In other implementations, the training dataset can directly include the audiographic images 10 and the computing system can simply access the audiographic images 10 from the training dataset stored in memory.

In some implementations, the training dataset can be designed for supervised learning and each audio signal or corresponding audiographic image 10 can be labeled or otherwise associated with a set of ground truth data that provides a "correct" prediction relative to the corresponding audio signal. In other implementations, the training dataset can be designed for unsupervised learning and each audio signal or corresponding audiographic image 10 can be unlabeled or weakly labeled.

According to an aspect of the present disclosure, the computing system can perform one or more augmentation operations 12 on the one or more audiographic images 10 to generate one or more augmented images 14. The augmented images 14 can help the machine-learned audio processing model 16 to learn useful features which are robust to deformations in the time direction, partial loss of frequency information, and/or partial loss of small segments of speech. In such fashion, augmented training data can be generated which can be used to improve the machine-learned audio processing model 16 (e.g., to reduce overfitting or otherwise make the machine-learned audio processing model 16 more robust to variance in the input images/underlying audio signals). The machine-learned audio processing model 16 can be trained on some combination of the augmented images 14 and the original audiographic images 10. If the audiographic images 10 include ground truth labels, the label associated with an audiographic image 10 can be assigned to any augmented image 14 generated from such audiographic image 10.

As one example augmentation operation, the one or more augmentation operations 12 can include a time warping operation. For example, performing the time warping operation can include warping image content of the audiographic image along an axis representative of time (e.g., a horizontal axis). In some implementations, performing the time warping operation can include fixing spatial dimensions of the audiographic image 10 and warping the image content of the audiographic image 10 to shift a point within the image content a distance along the axis representative of time (e.g., such that all pixels are modified to account for such shifting).

In some implementations, the time warping operation can be applied via the function sparse_image_warp of tensorflow. In particular, as one example, given an audiographic image 10 with a horizontal time axis representative of τ time steps and a vertical frequency axis, a point (e.g., a user-selected point, a randomly selected point, or a learned point) along the horizontal line passing through the center of the image within the time steps (W; τ–W) can be warped to a distance w along that line. The distance w can be a user-specified value, a randomly selected value, or a learned value. As one example, in some implementations, the distance w can be chosen from a uniform distribution from 0 to a time warp parameter or attribute W. The time warp parameter or attribute W can be a user-specified value, a randomly selected value, or a learned value.

As another example, the one or more augmentation operations 12 can include a frequency masking operation. For example, performing the frequency masking operation can include changing pixel values for image content associated with a certain subset of frequencies represented by the at least one audiographic image. As one example, the certain subset of frequencies can extend from a first frequency to a second frequency that is spaced a distance from the first frequency. The distance can be a user-specified value, a randomly selected value, or a learned value. In some implementations, the distance can be selected from a distribution extending from zero to a frequency mask parameter or attribute. The frequency mask parameter can be a user-specified value, a randomly selected value, or a learned value.

Thus, in some implementations, the frequency masking operation can be applied so that f consecutive frequencies $[f_0; f_0+f)$ are masked, where f is first chosen from a uniform distribution from 0 to the frequency mask parameter F, and $f_0$ is chosen from $[0; v-f)$. Here, v is the dimension of a vector (e.g., a filter bank vector) that is visualized by the audiographic image.

As yet another example, the one or more augmentation operations 12 can include a time masking operation. For example, performing the time masking operation can include changing pixel values for image content associated with a certain subset of a time steps represented by the at least one audiographic image. As one example, the certain subset of time steps can extend from a first time step to a second time step that is spaced a distance from the first time step. The distance can be a user-specified value, a randomly selected value, or a learned value. In some implementations, the distance can be selected from a distribution extending from zero to a time mask parameter or attribute. The time mask parameter can be a user-specified value, a randomly selected value, or a learned value.

Thus, in some implementations, the time masking operation can be applied so that t consecutive time steps $[t_0; t_0+t)$ are masked, where t is first chosen from a uniform distribution from 0 to the time mask parameter T, and $t_0$ is chosen from $[0; τ-t)$.

In some implementations, the computing system can enforce an upper bound on a ratio of the certain subset of time steps to all time steps. As one example, the computing system can enforce an upper bound on the time mask so that a time mask cannot be wider than p times the number of time steps, where p is a value between zero and one.

In some implementations, masking the pixels of the audiographic image 10 (e.g., to perform frequency masking and/or time masking) can include changing the pixel values for the image content to be masked to equal a mean value associated with the audiographic image. As an example, in some implementations, prior to performing the augmentation operations 12, the computing system can normalize the audiographic image 10 to have mean value zero, and thus, in such implementations, setting the masked pixel values to zero is equivalent to setting it to the mean value.

As other examples, the one or more augmentation operations 12 can include various other operations to modify the audiographic images 10 including, as examples, adding noise to the pixel values of the image 10, rotating some or all of the image 10, translating some or all of the image 10 (e.g., along either axis), averaging two or more audiographic images 10 together (e.g., according to respective weightings), and/or various other operations.

Any number (e.g., 1, 2, 3, etc.) of different augmentation operations 12 can be applied to any given audiographic image 10 to generate an augmented image 14. As examples, in some implementations, the computing system can apply multiple frequency and/or time masks. The masks may or may not overlap.

The operations 12 applied to one of the audiographic images 10 can be the same as or different from than the operations applied to another of the audiographic images 10. The operation(s) 12 applied to any given image 10 can be selected by a user or randomly selected.

Referring again to FIG. 1, to continue the training process, the machine-learned audio processing model 16 can receive the augmented images 14 and can process the augmented images 14 to generate one or more predictions 18 relative to the audio signals. The predictions 18 can be any prediction that is relevant to processing of the audio signal.

In some examples, some or all of the audio signals can encode human speech utterances. In some of such implementations, the one or more predictions 18 respectively generated by the machine-learned audio processing model 16 can include one or more textual transcriptions of the one or more human speech utterances. Thus, the machine-learned audio processing model 16 can operate to perform automatic speech recognition on the audio signal (e.g., as represented by the augmented images 14).

As another example, the one or more predictions 18 respectively generated by the machine-learned audio processing model 16 can include one or more output audiographic images that respectively visually represent one or more output audio signals that respectively encode one or more output human speech utterances. For example, the one or more output human speech utterances comprise the one or more human speech utterances translated into a different language or converted into a different speaking voice. The output audiographic images can be converted to the output audio signals (e.g., through the use of a vocoder). Thus, the machine-learned audio processing model 16 can operate to perform speech-to-speech translation and/or voice conversion on the audio signal (e.g., as represented by the augmented images 14).

The machine-learned audio processing model 16 can include any different type of machine-learned model, including, as an example, a neural network such as, for example, a recurrent neural network (e.g., a bi-directional long short term memory recurrent neural network). In some implementations, the machine-learned audio processing model 16 can be structured as an end-to-end model. Alternatively, the machine-learned audio processing model 16 can be structured as a classical multi-stage model or a hybrid model ,such as, for example, a hybrid hidden Markov model and deep neural network. In some implementations, the machine-learned audio processing model 16 can be structured as a sequence-to-sequence model. In some implementations, the machine-learned audio processing model 16 can include a language model.

As one example model structure, FIG. 2 depicts a block diagram of an example machine-learned audio processing model 21 that includes encoder 24, attention 26, and decoder 28 models according to example embodiments of the present disclosure. The encoder model 24 can be configured to receive and process an input image 22 that visually represents a first audio signal to generate a series of hidden state representations 25. The attention model 26 can be configured to receive and process the series of hidden state representations 25 to generate a series of attention outputs 27. The decoder model 28 can be configured to receive and process the series of attention outputs 27 to generate a prediction 30. As described the prediction 30 can be any different type of prediction, including, as examples, a textual transcription of speech included in the first audio signal or an image that visually represents a second audio signal (e.g., which contains translated and/or voice converted human speech).

Referring again to FIG. 1, to continue the training process, the predictions 18 can be evaluated by an objective function 20. In some implementations in which the training dataset includes ground truth labels for the audio signals and/or corresponding audiographic images 10, the objective function 20 can be or include a loss function that evaluates a respective difference between the one or more predictions 18 and the one or more sets of ground truth data included in the training dataset. However, the objective function 20 can take any form which evaluates a performance of the machine-learned audio processing model 16 in processing the inputs to generate the predictions 18.

The computing system can modify respective values of one or more parameters of the machine-learned audio processing model based on the objective function 20. As one example, the objective function 20 can be backpropagated (e.g., using gradient descent techniques) through the machine-learned audio processing model 16 to learn updated values for the parameters of the machine-learned audio processing model 16.

In such fashion, the augmented images 14 can be used to improve the machine-learned audio processing model 16 (e.g., to reduce overfitting or otherwise make the machine-learned audio processing model 16 more robust to variance in the input images/underlying audio signals).

Example Augmented Images

FIG. 3A depicts an example audiographic image that visually represents an audio signals according to example embodiments of the present disclosure.

Figure 3B:
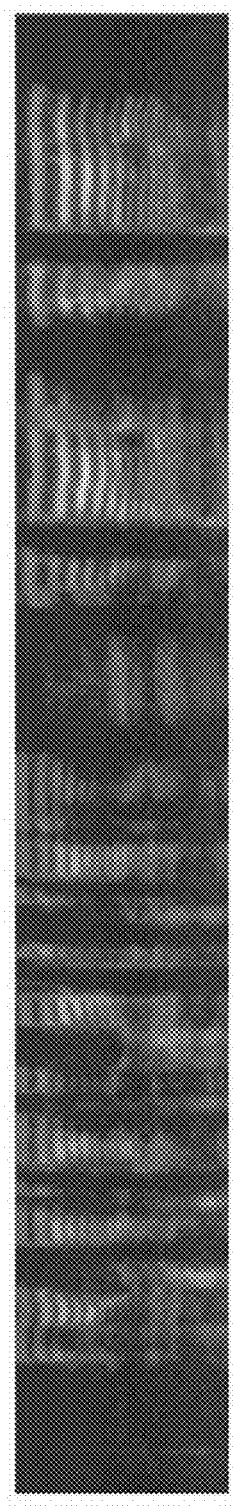
FIGS. 3B-D depict example augmented images that have been generated through augmentation of the image of FIG. 3A according to example augmentation operations according to example embodiments of the present disclosure.
Figure 3C:
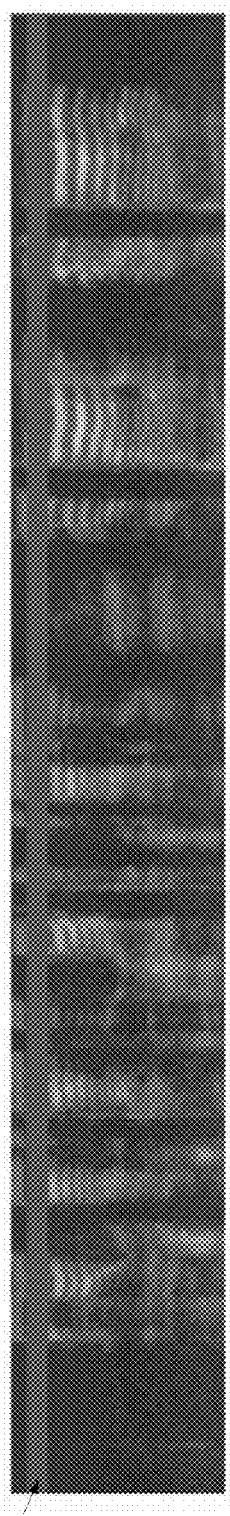
Figure 3D:
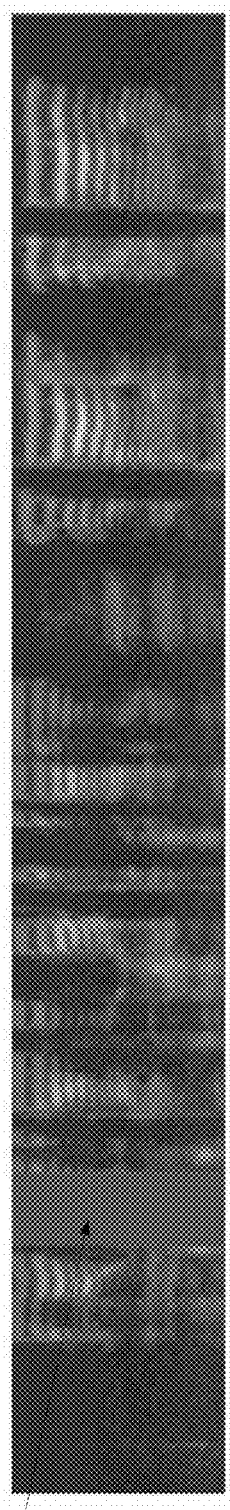

FIGS. 3B-D depict example augmented images that have been augmented according to example augmentation operations according to example embodiments of the present disclosure. In particular, FIGS. 3B-D depict example augmented images that have been generated by respectively performing different augmentation operations on the audiographic image of FIG. 3A.

More specifically, FIG. 3B shows an augmented image generated by applying a time warp operation to the audiographic image of FIG. 3A; FIG. 3C shows an augmented image generated by applying a frequency masking operation to the audiographic image of FIG. 3A (e.g., resulting in frequency mask 302); and FIG. 3D shows an augmented image generated by applying a time masking operation to the audiographic image of FIG. 3A (e.g., resulting in time mask 304).

Figure 4A:
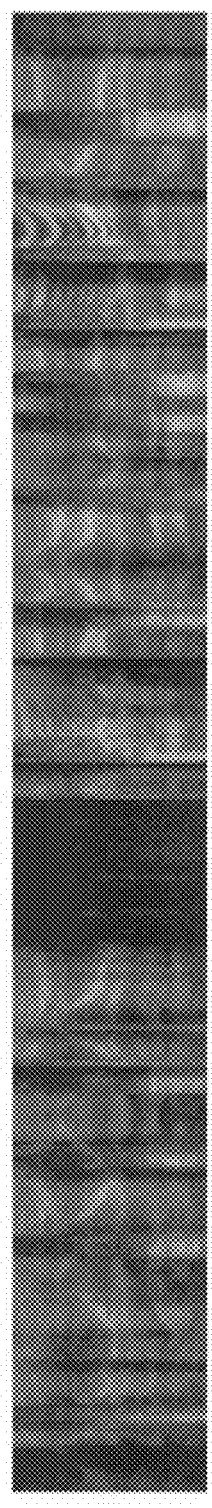
FIG. 4A depicts an example audiographic image that visually represents an audio signal according to example embodiments of the present disclosure.
Figure 4B:
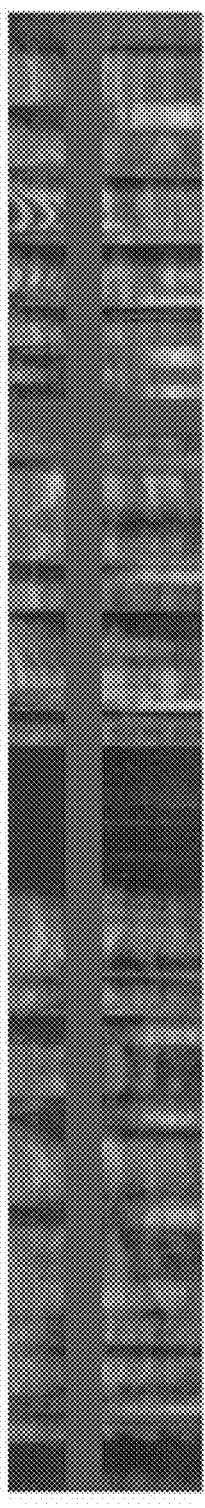
FIGS. 4B-C depict example augmented images that have been generated through augmentation of the image of FIG. 4A according to example augmentation operations according to example embodiments of the present disclosure.
Figure 4C:
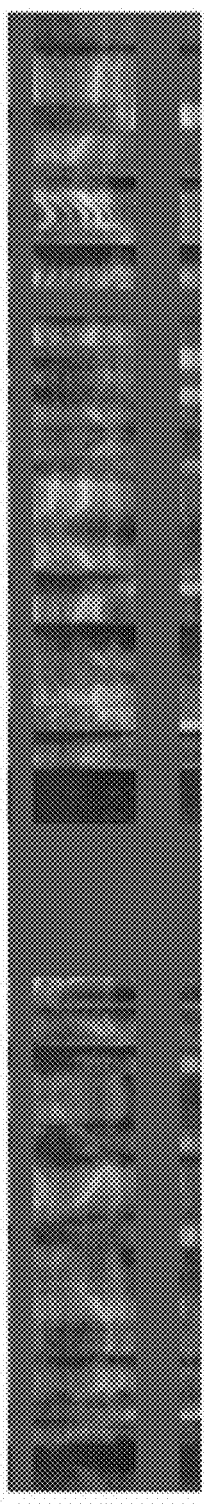

FIG. 4A depicts an example audiographic image that visually represents an audio signals according to example embodiments of the present disclosure. FIGS. 4B-C depict example augmented images that have been generated by respectively performing multiple different augmentation operations on the audiographic image of FIG. 4A. More specifically, the augmented image of FIG. 4B results from performing a LB policy of operations and the augmented image of FIG. 4C results from performing a LD policy of operations. These example policies and others are shown in Table 1 below, where $m_F$ and $m_T$ denote the number of frequency and time masks applied, respectively.

TABLE 1

| Policy | W | F | $m_F$ | T | p | $m_T$ |
|---|---|---|---|---|---|---|
| None | 0 | 0 | — | 0 | — | — |
| LB | 80 | 27 | 1 | 100 | 1.0 | 1 |
| LD | 80 | 27 | 2 | 100 | 1.0 | 2 |
| SM | 40 | 15 | 2 | 70 | 0.2 | 2 |
| SS | 40 | 27 | 2 | 70 | 0.2 | 2 |

Example Devices and Systems

Figure 5A:
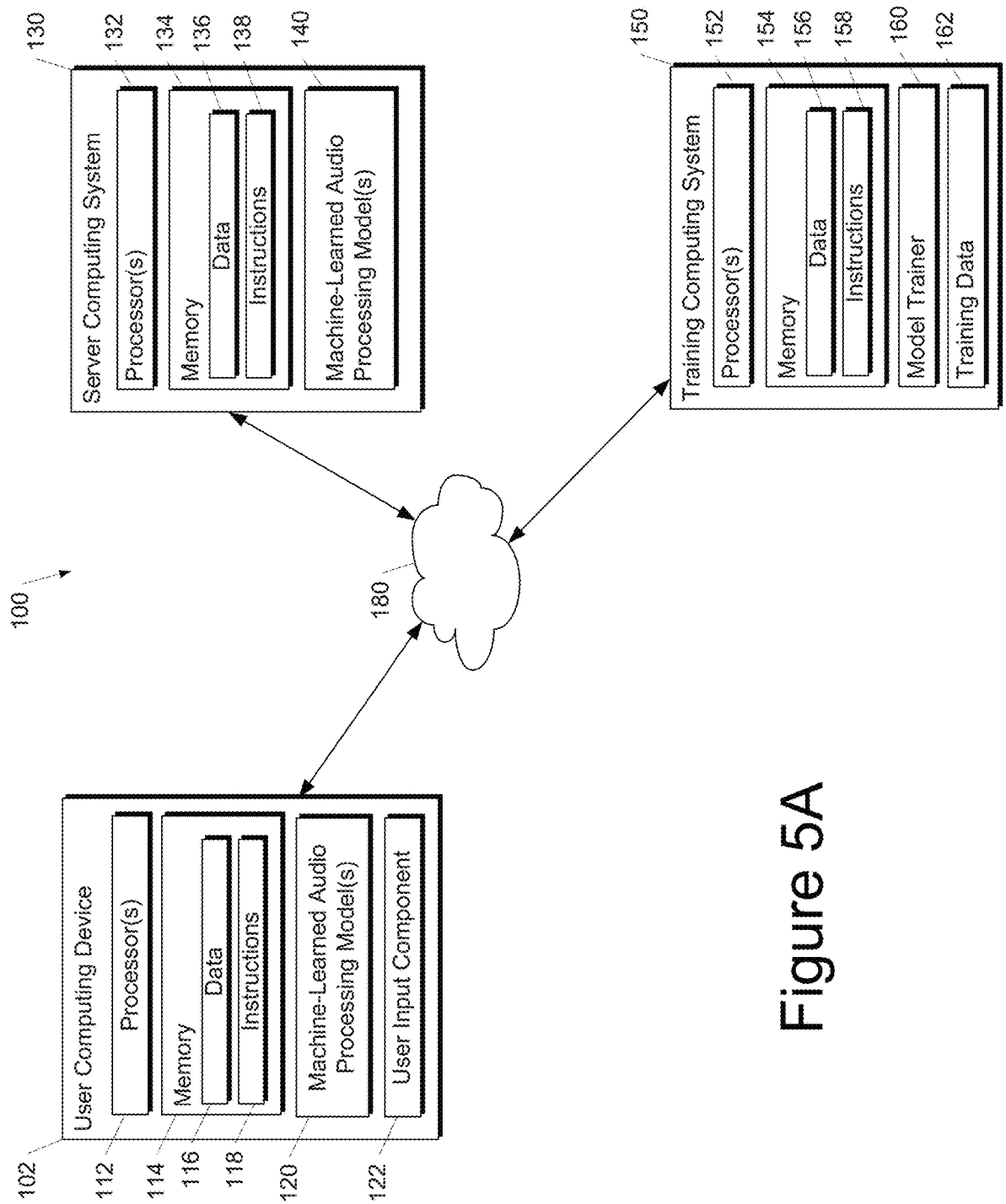
FIG. 5A depicts a block diagram of an example computing system according to example embodiments of the present disclosure.

FIG. 5A depicts a block diagram of an example computing system 100 that performs data augmentation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected.

The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned audio processing models 120. For example, the machine-learned audio processing models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned audio processing models 120 are discussed with reference to FIGS. 1-2.

In some implementations, the one or more machine-learned audio processing models 120 can be received from the server computing system 130 over network 180, stored in the user computing device memory 114, and then used or otherwise implemented by the one or more processors 112. In some implementations, the user computing device 102 can implement multiple parallel instances of a single machine-learned audio processing model 120 (e.g., to perform parallel audio processing across multiple instances of audio signals).

Additionally or alternatively, one or more machine-learned audio processing models 140 can be included in or otherwise stored and implemented by the server computing system 130 that communicates with the user computing device 102 according to a client-server relationship. For example, the machine-learned audio processing models 140 can be implemented by the server computing system 130 as a portion of a web service (e.g., an audio processing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned audio processing models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. The model trainer 160 can implement some or all of the data flow illustrated in FIG. 1.

In particular, the model trainer 160 can train the machine-learned audio processing models 120 and/or 140 based on a set of training data 162. The training data 162 can include, for example, audio signals (e.g., raw audio signal data) and/or audiographic images that visually represent the audio signals. In some implementations, the training data 162 can be designed for supervised learning and each audio signal or corresponding audiographic image can be labeled or otherwise associated with a set of ground truth data that provides a "correct" prediction relative to the corresponding audio signal. In other implementations, the training data 162 can be designed for unsupervised learning and each audio signal or corresponding audiographic image can be unlabeled or weakly labeled.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
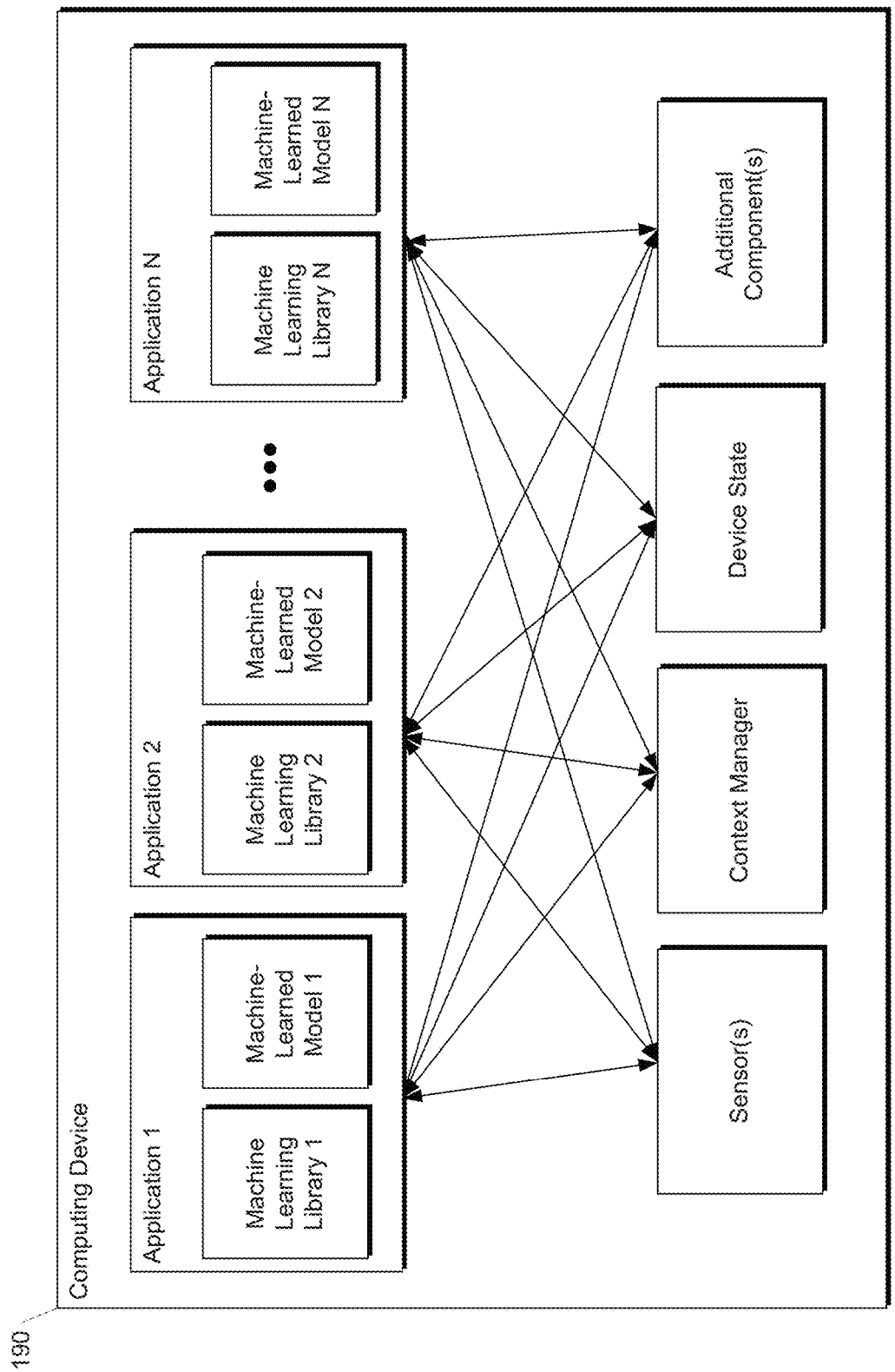
FIG. 5B depicts a block diagram of an example computing device according to example embodiments of the present disclosure.

FIG. 5B depicts a block diagram of an example computing device 190 that performs according to example embodiments of the present disclosure. The computing device 190 can be a user computing device or a server computing device.

The computing device 190 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
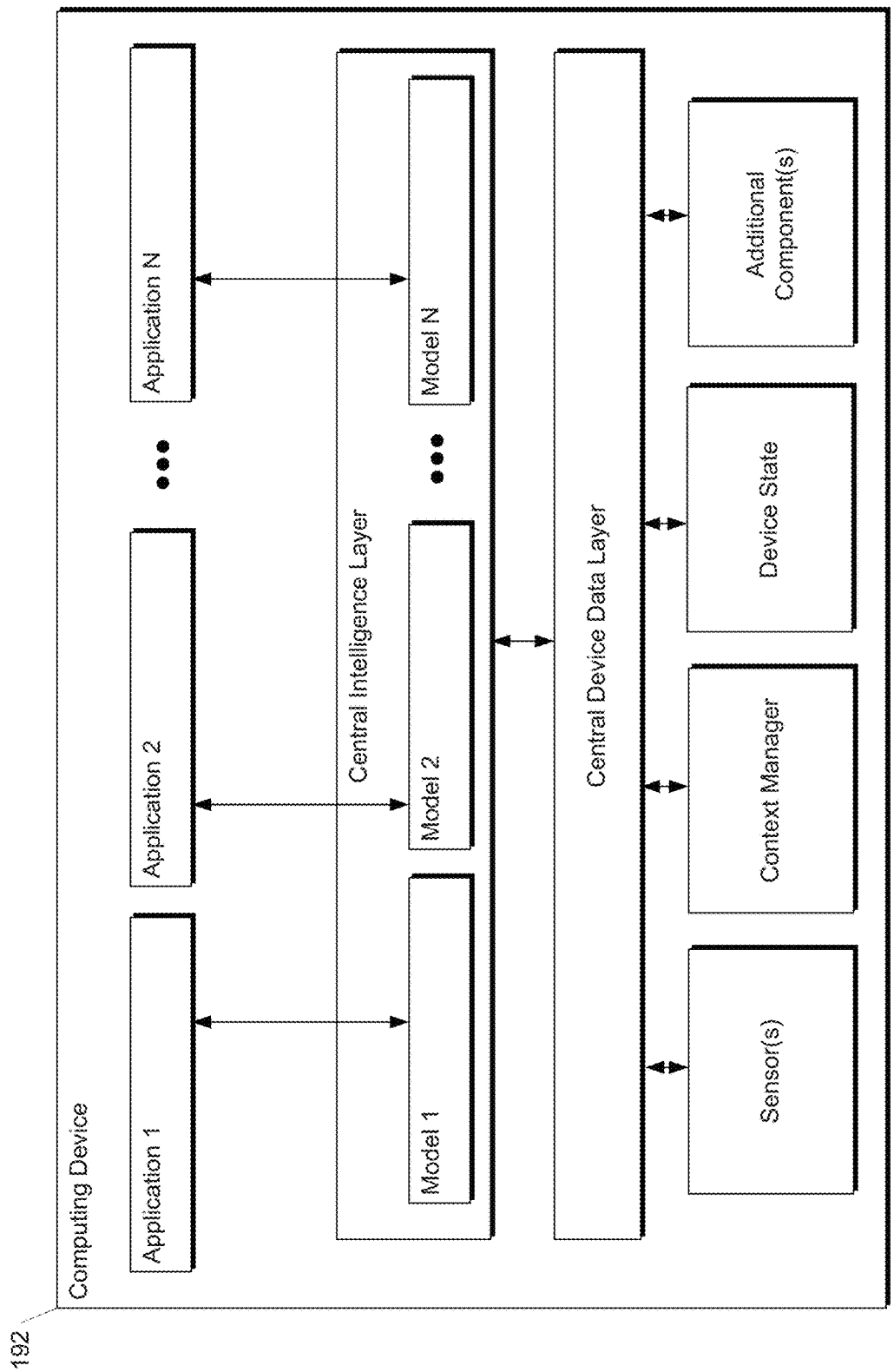
FIG. 5C depicts a block diagram of an example computing device according to example embodiments of the present disclosure.

FIG. 5C depicts a block diagram of an example computing device 192 that performs according to example embodiments of the present disclosure. The computing device 192 can be a user computing device or a server computing device.

The computing device 192 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 192.

The central intelligence layer can communicate with a central device data layer. The central device data layer can be a centralized repository of data for the computing device 192. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Automated Augmentation Policy Search

Figure 6:
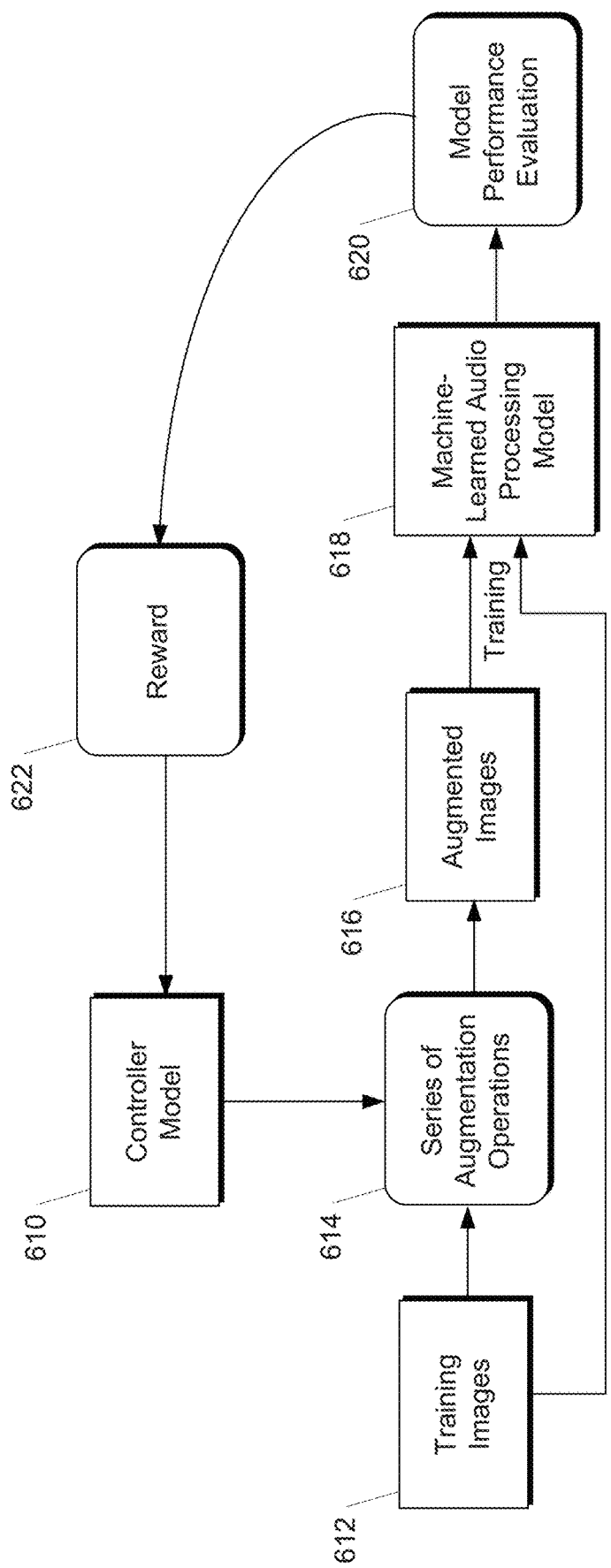
FIG. 6 depicts a block diagram of data flow in an example reinforcement learning approach according to example embodiments of the present disclosure.

FIG. 6 depicts a block diagram of data flow in an example reinforcement learning approach according to example embodiments of the present disclosure. In particular, the illustrated approach can be applied in an iterative fashion. The illustrated approach includes a controller model 610 which can operate to select, at each iteration, a series of augmentation operations 614 to be applied to one or more training images 612 to respectively generate one or more augmented images 616.

The controller model 610 can be configured to, for each of a number of iterations, select a series of one or more augmentation operations 614. In particular, in some implementations, the controller model 610 can select the series of one or more augmentation operations from a defined search space that includes a plurality of available augmentation operations. The defined search space can include various operations and/or other searchable parameters that have been designed and/or modified by a user to guide the search process. In some implementations, the set of available augmentation operations can include some or all of the augmentation operations described with reference to FIG. 1, including the time warping operation, the frequency masking operation, and/or the time masking operation.

In some implementations, the controller model 610 can also select/search other respective characteristics for each selected operation such as: a respective probability of performance of the operation and/or a respective augmentation magnitude that controls a relative intensity of application of the operation to the image. For example, the augmentation magnitude can include values for various parameters or attributes such as the values for W, F, $m_F$, T, p, and/or $m_T$.

Thus, in some implementations, the controller model 610 can select a series of operations and the characteristics for each operation. As one example, the output of the controller model 610 can be represented as: {(Operation $O_1$, overall operation probability $p_1^o$, magnitude $m_1$), (Operation $O_2$, overall operation probability $p_2^o$, magnitude $m_2$), . . . , (Operation $O_N$, overall operation probability $p_N^o$, magnitude $m_N$)}.

In some implementations, for each iteration, the number N of augmentation operations in the series of augmentation operations can be a user-selected hyperparameter. In other implementations, the number N of augmentation operations in the series of one or more augmentation operations is selected by the controller model.

In some implementations, the controller can select the respective augmentation magnitude for at least one of the augmentation operations from a respective set of discrete and operation-specific available magnitudes. For example, the set of discrete and operation-specific available magnitudes can be user-selected hyperparameters. In some implementations, the set of discrete magnitudes can be a range of discrete magnitudes.

At each iteration, one or more training images 612 can be augmented according to the series of augmentation operations 614 selected by the controller model 610 at the current iteration, thereby generating one or more augmented images 616. Next, a machine-learned audio processing model 618 can be trained using the training data including the augmented images 616 generated at the current iteration. A performance metric 620 (e.g., average precision, accuracy, latency, model data size, and/or various other measures of model performance) can be evaluated for the trained model 618.

According to the reinforcement learning architecture, the controller model 610 can serve as an agent that selects the augmentation strategies 614. The controller model 610 be provided with a reward 622 that is a function of the performance 620 of the model 618. The parameters of the controller model 610 can be updated based on the reward. For example, the controller model 610 can be a recurrent neural network and the reward function can be backpropagated through the recurrent neural network to train the network. In such fashion, the controller model 610 can learn over time to generate augmentation strategies 614 which result in augmented training data 616 which teaches the machine-learned model 618 to perform at an increased performance level.

Although aspects of the present disclosure focus on a reinforcement learning approach, other example embodiments may operate according to an evolutionary scheme. For example, in the evolutionary scheme, the controller model 610 can be configured to generate a new series of augmentation operations 614 through an evolutionary mutation. The performance 620 of the model 618 obtained via the most recently proposed augmentation strategy 614 can be compared to a best previously observed performance to determine, for example, whether to retain the most recently proposed augmentation strategy 614 or to discard the most recently proposed augmentation strategy 614 and instead return to a best previously observed augmentation strategy. Thereafter, to generate the next iterative augmentation strategy 614, the controller model can perform evolutionary mutations on the augmentation strategy selected based on the comparison described above.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to generate augmented training data, the method comprising:
 obtaining, by one or more computing devices, a plurality of audiographic images that visually represent an audio signal, wherein the plurality of audiographic images correspond to a plurality of times of the audio signal;
 generating, using one or more augmentation operations, a plurality of augmented images based on the plurality of audiographic images, wherein the one or more augmentation operations includes:
  a time warping operation comprising warping image content of the audiographic image along an axis representative of time,
  a frequency masking operation comprising changing pixel values for image content associated with a certain subset of frequencies represented by the audiographic image, or
  a time masking operation comprising changing pixel values for image content associated with a certain subset of a time steps represented by the audiographic image;
 inputting, by the one or more computing devices, the plurality of augmented images into a machine-learned audio processing model to generate one or more predictions;
 evaluating, by the one or more computing devices, an objective function that scores the one or more predictions generated by the machine-learned audio processing model; and
 modifying, by the one or more computing devices, respective values of one or more parameters of the machine-learned audio processing model based on the objective function.

2. The computer-implemented method of claim 1, wherein performing the time warping operation comprises fixing spatial dimensions of the audiographic image and warping the image content of the audiographic image to shift a point within the image content a distance along the axis representative of time.

3. The computer-implemented method of claim 2, wherein the distance comprises a user-specified hyperparameter or a learned value.

4. The computer-implemented method of claim 2, wherein the point within the image content is randomly selected.

5. The computer-implemented method of claim 1, wherein:

the certain subset of frequencies extends from a first frequency to a second frequency that is spaced a distance from the first frequency;

the distance is selected from a distribution extending from zero to a frequency mask parameter.

6. The computer-implemented method of claim 1, wherein changing the pixel values for the image content associated with the certain subset of frequencies comprises changing the pixel values for the image content to equal a mean value associated with the audiographic image.

7. The computer-implemented method of claim 1, wherein performing the frequency masking operation comprises enforcing an upper bound on a ratio of the certain subset of frequencies to all frequencies.

8. The computer-implemented method of claim 1, wherein:

the certain subset of time steps extends from a first time step to a second time step that is spaced a distance from the first time step;

the distance is selected from a distribution extending from zero to a time mask parameter.

9. The computer-implemented method of claim 1, wherein changing the pixel values for the image content associated with the certain subset of time steps comprises changing the pixel values for the image content to equal a mean value associated with the audiographic image.

10. The computer-implemented method of claim 1, wherein performing the time masking operation comprises enforcing an upper bound on a ratio of the certain subset of time steps to all time steps.

11. The computer-implemented method of claim 1, wherein each of the audiographic images comprises:

one or more filter bank sequences.

12. The computer-implemented method of claim 1, wherein:

the audio signal encodes one or more human speech utterances; and the one or more predictions generated by the machine-learned audio processing model comprise:

one or more textual transcriptions of the one or more human speech utterances.

13. The computer-implemented method of claim 1, wherein the machine-learned audio processing model comprises one or both of:

a hybrid hidden Markov model and deep neural network.

14. The computer-implemented method of claim 1, wherein the machine-learned audio processing model comprises:

a convolutional neural network.

15. The computer-implemented method of claim 1, wherein each audiographic image comprises a combination of $\tau$ time steps of the plurality of times of the audio signal.

16. The computer-implemented method of claim 1, wherein the plurality of augmented images is generated using at least two of the one or more augmentation operations.

17. The computer-implemented method of claim 1, wherein the plurality of augmented images is generated using at least three of the one or more augmentation operations.

18. The computer-implemented method of claim 1, wherein the machine- learned audio processing model performs automatic speech recognition on the audio signal as represented by the plurality of audiographic images.

19. The computer-implemented method of claim 1, wherein the machine-learned audio processing model performs speech-to-speech translation.

20. The computer-implemented method of claim 1, wherein the machine-learned audio processing model performs voice conversion on the audio signal.

21. One or more non-transitory computer-readable media that collective store instructions that, when executed by one or more processors, cause the one or more processors to perform operations, the operations comprising:

obtaining a plurality of audiographic images that visually represent an audio signal, wherein the plurality of audiographic images correspond to a plurality of times of the audio signal;

generating, using one or more augmentation operations, a plurality of augmented images based on the plurality of audiographic images, wherein the one or more augmentation operations includes:

a time warping operation comprising warping image content of the audiographic image along an axis representative of time, a frequency masking operation comprising changing pixel values for image content associated with a certain subset of frequencies represented by the audiographic image, or a time masking operation comprising changing pixel values for image content associated with a certain subset of a time steps represented by the audiographic image;

inputting the plurality of augmented images into a machine-learned audio processing model to generate one or more predictions;

evaluating an objective function that scores the one or more predictions generated by the machine-learned audio processing model; and modifying respective values of one or more parameters of the machine-learned audio processing model based on the objective function.

22. A computing system comprising:

one or more processors;

a controller model; and one or more non-transitory computer-readable media that collectively store instructions that, when executed by the one or more processors, cause the computing system to perform operations, the operations comprising:

accessing a training dataset that comprises a plurality of training images, wherein each training image comprises an audiographic image that visually represents an audio signal, and wherein the plurality of training images correspond to a plurality of times of the audio signal; and for each of a plurality of iterations:

selecting, by the controller model, a series of one or more augmentation operations;

performing the series of one or more augmentation operations on each of one or more training images to generate one or more augmented images, wherein the one or more augmentation operations includes:

a time warping operation comprising warping image content of the audiographic image along an axis representative of time, a frequency masking operation comprising changing pixel values for image content associated with a certain subset of frequencies represented by the audiographic image, or a time masking operation comprising changing pixel values for image content associated with a certain subset of a time steps represented by the audiographic image;

training a machine-learned audio processing model based at least in part on the one or more augmented images; and after training the machine-learned audio processing model, evaluating one or more performance characteristics of the machine-learned audio processing model.

\* \* \* \* \*